Aug. 10, 1948.   T. W. W. FORREST   2,446,646
RAISIN STEMMING DEVICE INCLUDING
RECIPROCATING LADDER-LIKE GRIDS
Filed Aug. 13, 1945   2 Sheets-Sheet 1
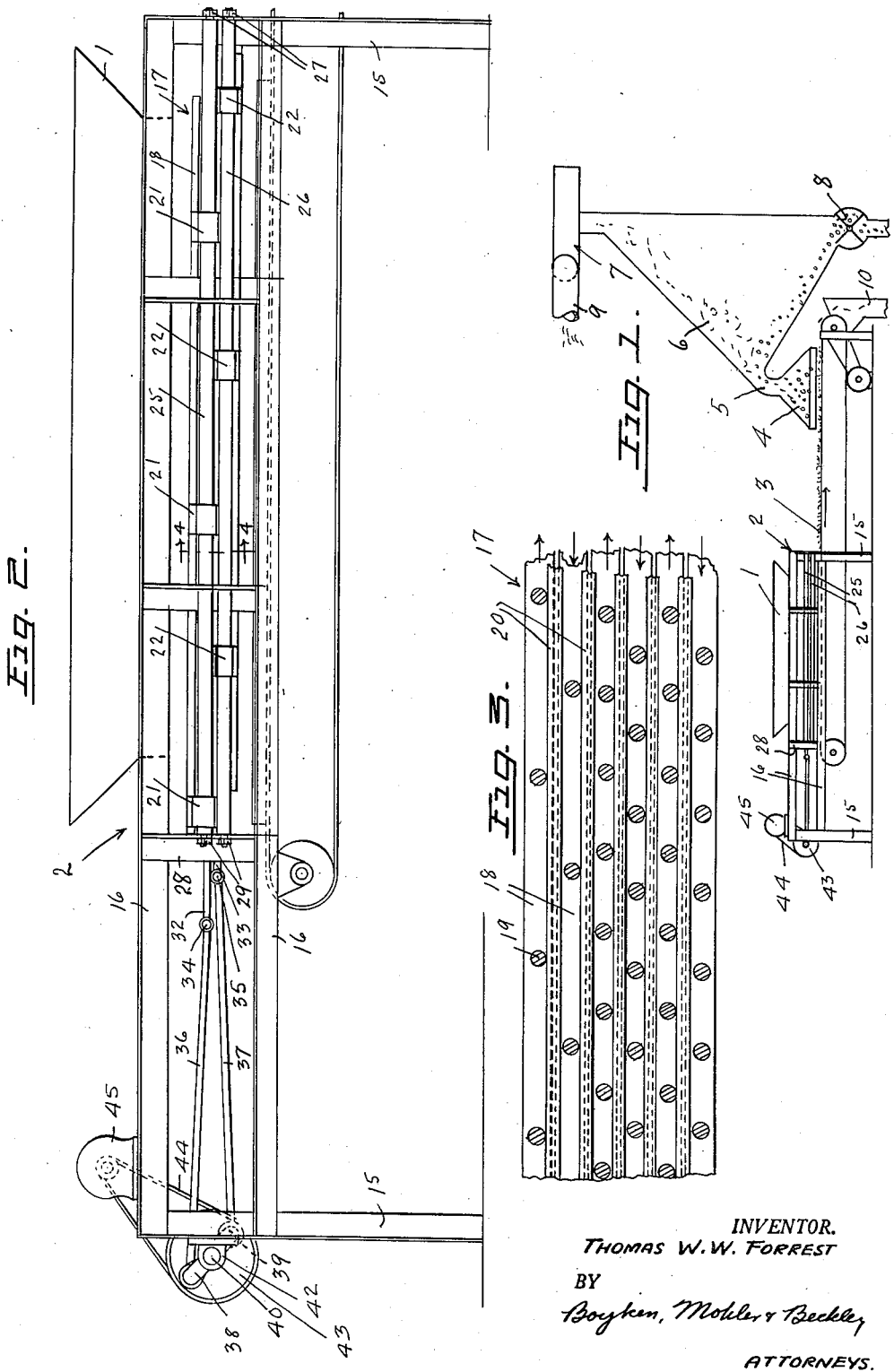
INVENTOR.
THOMAS W. W. FORREST
BY
Boyken, Mohler & Beckley
ATTORNEYS.

Aug. 10, 1948.  T. W. W. FORREST  2,446,646
RAISIN STEMMING DEVICE INCLUDING
RECIPROCATING LADDER-LIKE GRIDS

Filed Aug. 13, 1945  2 Sheets-Sheet 2

INVENTOR.
THOMAS W.W. FORREST
BY
Boyken, Mohler & Beckley
ATTORNEYS

Patented Aug. 10, 1948

2,446,646

UNITED STATES PATENT OFFICE 2,446,646

RAISIN STEMMING DEVICE INCLUDING RECIPROCATING LADDERLIKE GRIDS

Thomas W. W. Forrest, Fresno, Calif., assignor to D. R. Hoak, Fresno, Calif.

Application August 13, 1945, Serial No. 610,447

1 Claim. (Cl. 146—55)

This invention relates to the stemming and cleaning of raisins prior to decapping them.

One of the objects of the invention is the provision of an improved method of cleaning raisins including the stemming operation whereby the stems, dirt and other foreign material will not become embedded in the raisins but will be separated therefrom, leaving the raisins relatively clean and unbroken.

Another object of the invention is improvements in a stemmer that will be more reliable than heretofore and that will more effectively remove the stems from the raisins and prepare them for a cleaner subsequent separation.

Other objects and advantages will appear in the description and in the drawings.

In the drawings

Fig. 1 is a semi-diagrammatic view illustrative of means that may be employed in practicing the method.

Fig. 2 is a side elevational view of the stemmer.

Fig. 3 is a vertical cross sectional view of part of the stemmer as seen from line 3—3 of Fig. 4, the fragment being of reduced scale from that of Fig. 4 and of larger scale than that of Fig. 1.

Figure 4:
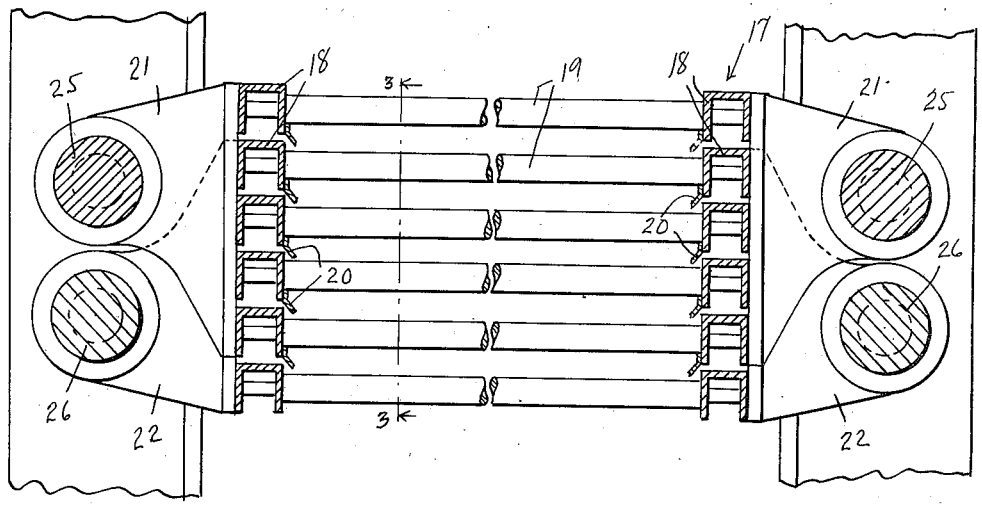
Fig. 4 is an enlarged sectional view taken along line 4—4 of Fig. 2.

In detail the method of stemming and cleaning raisins may be best understood by reference to Fig. 1 wherein a hopper 1 is for receiving the unstemmed raisins that may have dirt, nails, pebbles, leaves and other foreign material mixed therewith.

Hopper 1 feeds the raisins and other material to the stemmer 2 through which the raisins and material fall by gravity, the said raisins being pulled from the stems and the stems being broken and foreign material being knocked loose from the raisins in falling through the stemmer.

All of the material falling through the stemmer including the raisins and the foreign material that is lighter and heavier than the raisins falls onto a conveyor belt 3 and is carried from beneath the stemmer to below a suction hood 4 that communicates by way of a restricted neck 5 with an enlarged vacuum chamber 6. Suction blower 7 is at the upper end of chamber 6 for exhausting the latter and for creating the desired suction in the hood 4, while a rotary valve 8 at the lower end of chamber 6 functions, upon rotation, to discharge raisins falling to said valve while preventing a break in the reduced pressure in the chamber 6.

The suction in hood 4 is such as to draw the raisins and all material of lighter weight, such as stems, leaves, dust, caps, etc., through the neck 5 into chamber 7 wherein the influence of the suction created by blower 7 is such as to draw the material that is lighter than the raisins through the blower for discharge through the discharge outlet 9 while the raisins will fall to the valve or gate 8 for discharge and for subsequent delivery to the decapper.

The material that is heavier than the raisins, such as rocks, nails, etc., will be discharged over the end of conveyor 3 into any suitable receptacle or chute 10.

The foregoing method is made possible by the fact that the stems are broken up to a certain extent and also any foreign material that may be adhered to the raisins is knocked loose. Furthermore there being no pressure on the raisins by the stemmer, as normally occurs in the conventional roller type of stemmer, there is no chance of pressing dirt, stems, etc. into the raisins or in rupturing the latter.

The stemmer 2 comprises a frame having supporting legs 15 and pairs of horizontally extending side frame members 16 at each side of the stemmer.

Between the pairs of side frame members 16 that are at each side of the stemmer are a plurality of horizontally disposed, superposed, spaced, horizontally extending ladder-like members generally designated 17. Each of these members comprises spaced parallel channel strips 18 having their open sides facing downwardly, said strips forming the side rails of the ladder-like members. Cross bars 19 extend between the side rails of each member 17 at right angles to said rails each of said bars having reduced end portions extending through channels 18. In each member 17 the cross bars are equally spaced apart but the spacing between the cross bars of the upper two members is greater than the spacing between the rails of the remaining members. Preferably the spacing between the cross bars of the upper two members 17 is uniform and the spacing between the cross bars in the remaining members is uniform as best seen in Fig. 3.

As seen in Fig. 3 there are six members 17 which is satisfactory although there may be any number, preferably four or more.

The spacing between the superposed side rails 18 adjacent each side of the stemmer is relatively small and in order to prevent raisins and dirt, etc. from becoming lodged between said rails, I provide deflecting strips 20 that are respectively secured to the uppermost rail 18 of each adjacent pair thereof, the said strips 20 being bent transversely of their lengths to deflect any material striking them toward the center of the stemmer between the side rails of the members 17.

The alternate members 17 are connected together in spaced relation by bearing members 21, 22. Thus the first, third and fifth of the members 17, commencing from the top, are connected by bearing members 21, while the second, fourth and sixth are connected by bearing member 22 (Figs. 2, 4). These bearing members are secured in any desired manner as by welding, bolting, etc. to the side rails 18 so as to project outwardly thereof relative to the space between the rails. There may be a plurality of such bearing members 21, 22 along each of the outer sides of members 17. The bearing members 22 along each of said outer sides are coaxially journalled for slidably supporting them on rods 26 that are below and parallel with rods 25 while bearing members 21 are coaxially journalled for slidably supporting them on rods 25. Rods 25, 26 may extend at one of their ends through the end legs 15 of the stemmer frame for securement to said end legs by nuts 27 (Fig. 2), the ends of the rods being of reduced diameter where they extend through said legs and their opposite ends may extend through vertical angle strips 28 that are in turn secured between side frame members 16 at each side of the stemmer. Nuts 29 may secure said latter ends to strips 28.

The bearing members 21, 22 thus support the ladder-like members 17 for reciprocation as well as spacing them apart.

Figure 5:
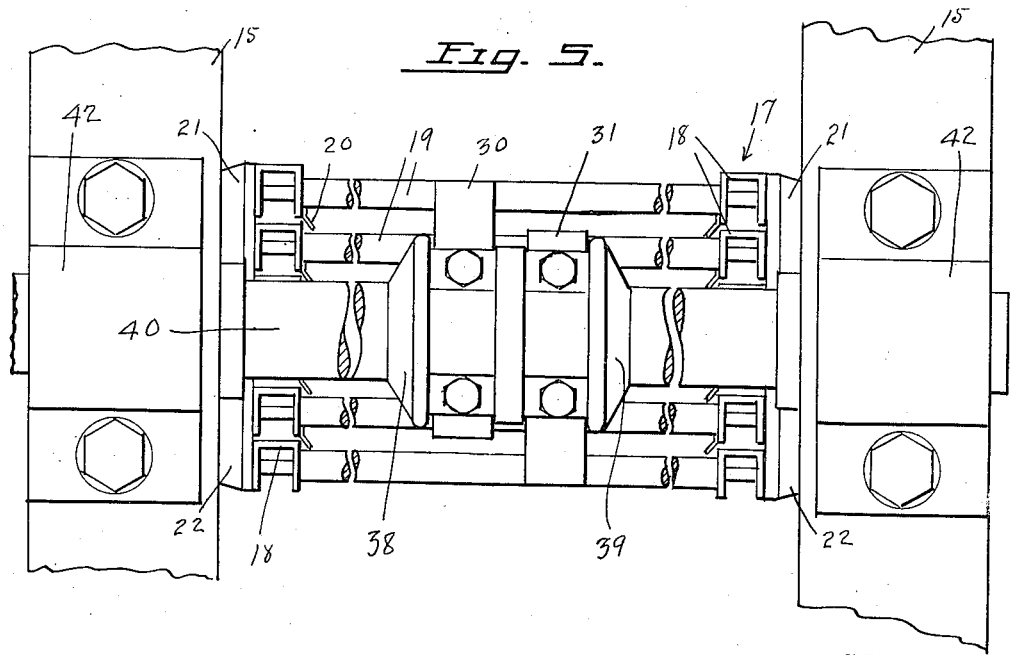
Fig. 5 is an enlarged left end view of the body of the stemmer of Fig. 1 with the cranks indicated at the same level instead of being offset as seen in Fig. 1.

The alternate pairs of ladder-like members 17 are also connected at their ends that are adjacent the strips 28 (Fig. 2) by vertically extending elements 30, 31 (Fig. 5) which elements carry horizontal links 32, 33 (Fig. 2) that are in turn respectively pivotally connected at 34, 35 to connecting rods 36, 37 that extend to cranks 38, 39 formed on a shaft 40.

Shaft 40 is journaled at its ends in bearings 42 that are secured to the end legs 15 at one end of the stemmer frame. A combination pulley and flywheel 43 may be secured to shaft 40 which pulley is connected by a belt 44 to any desired source of power such as motor 45.

Upon rotation of the shaft 40 the revolution of cranks 38, 39 will cause the adjacent members 17 to reciprocate oppositely. The unstemmed raisins dropped between the rails 18 will be engaged by the cross bars 19 and the very quick return stroke of the bars at each end of the crank throws will quickly pull the raisins from the stems. Also the stems will be broken up and the raisins will be sharply struck to free foreign material from them. Of course any lumps of dirt will also be broken up.

All of the material including the raisins will be then dropped onto the upper arm of conveyor belt 3 for transfer to below suction hood 4 as already described.

In so far as the stemmer itself is concerned the most important features thereof are the reciprocation of adjacent members 17 as distinguished from oscillation and the provision of deflector strips to prevent any material from becoming lodged between the side rails. The inverted channel shape of these side rails contributes toward keeping them clear of material that might tend to obstruct the freedom of their reciprocating movement.

I claim:

In a stemmer for raisins of the type having a plurality of pairs of horizontally disposed and horizontally extending vertically spaced superposed ladder-like members each having a pair of spaced parallel side rails and spaced parallel cross bars extending between said rails at right angles to the latter, means for supporting said members for reciprocation longitudinally thereof, means for simultaneously reciprocating adjacent pairs of said members in opposite directions, and means positioned between the rails of said members extending downwardly across the spaces between the adjacent rails of said members and inwardly toward each other for closing said spaces to ingress of stems and raisins adapted to fall through the spaces between said cross bars and for deflecting such stems and raisins inwardly away from said side walls, said side rails being channel strips with their open sides facing downwardly, and said last mentioned means being strips respectively secured to the uppermost side rail of each pair of superposed rails.

THOMAS W. W. FORREST.

REFERENCES CITED

The following references are of record in the file of this patent:

UNITED STATES PATENTS

| Number | Name | Date |
|---|---|---|
| 1,411,528 | Stanley | Apr. 4, 1922 |
| 1,924,111 | Erickson | Aug. 29, 1933 |
| 2,054,949 | Robinson et al. | Sept. 22, 1936 |
| 2,106,742 | Hinkle | Feb. 1, 1938 |
| 2,152,143 | Martin | Mar. 28, 1939 |
| 2,251,542 | Hines et al. | Aug. 5, 1941 |
| 2,297,700 | Hinkle | Oct. 6, 1942 |